June 28, 1966     L. J. SPERRY     3,258,665
VARIABLE CAPACITOR
Filed March 6, 1963
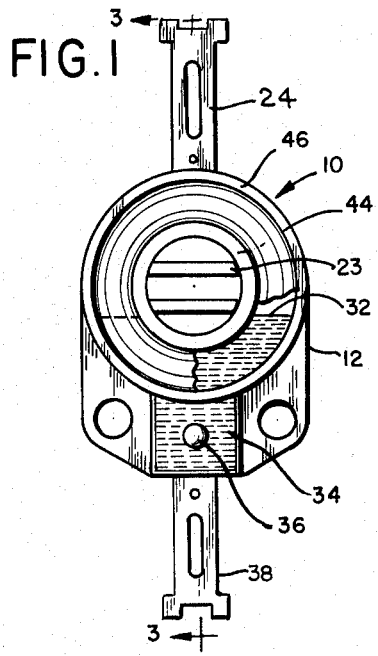
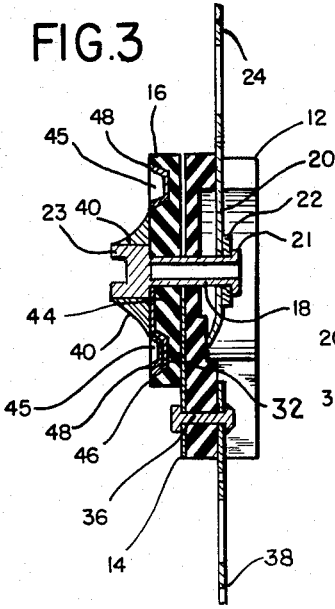
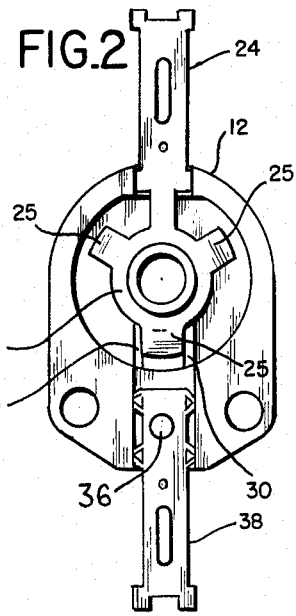
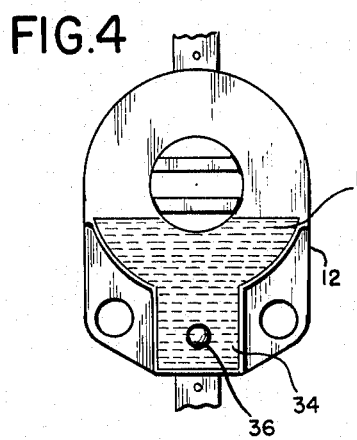
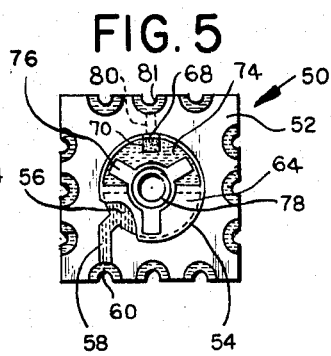
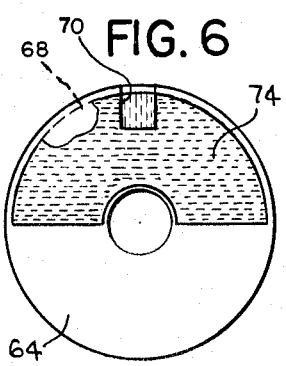
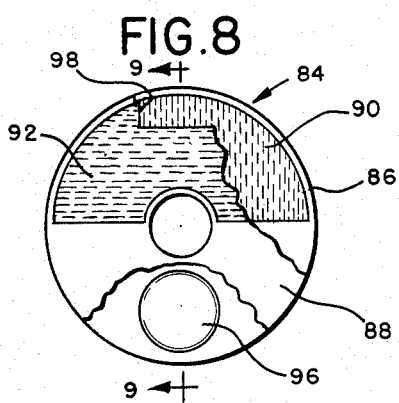
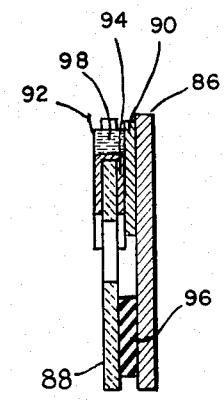
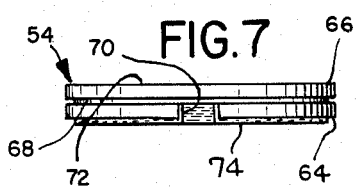
INVENTOR.
LEONARD J. SPERRY
BY
ATTORNEY United States Patent Office 3,258,665
Patented June 28, 1966

3,258,665
VARIABLE CAPACITOR
Leonard J. Sperry, Glendale, Wis., assignor to Globe-Union Inc., Milwaukee, Wis., a corporation of Delaware
Filed Mar. 6, 1963, Ser. No. 263,255
7 Claims. (Cl. 317—249)

This invention relates to variable capacitors and, more particularly, to an improved capacitor rotor and its method of construction.

It is well recognized that capacitance varies inversely with the distance between the capacitor plates and this characteristic would appear to lend itself quite well to providing high capacitance values without an increase in size of the unit. In variable capacitors, particularly those wherein the capacitor rotor provides the dielectric medium as well as the means by which the capacitor plates are moved into and out of alignment, the mechanical strength of the rotor is another factor for consideration in that a minimum rotor thickness must be maintained in order to withstand handling during both assembly and operation without excessive rotor breakage. This is a universal problem in the design of variable capacitors of this type, but is particularly acute in the area of miniaturized capacitor units. For these reasons, the physical or mechanical characteristics of the capacitor rotor have restricted rotor design from an electrical standpoint so that the available capacitance range of units constructed in accordance with heretofore accepted procedures has been limited.

An object of this invention is to increase the capacitance range of a variable capacitor.

Another object of this invention is to increase the capacitance range of a variable capacitor while providing a generally stronger unit and without an increase in the size of the unit.

For the achievement of these and other objects, it is proposed to reinforce the rotor of a variable capacitor to permit a reduction in the rotor thickness thereby increasing the available overall capacitance range.

Other objects and advantages will be pointed out in, or be apparent from the specification and claims, as will obvious modifications of the embodiments shown in the drawings, in which:

FIG. 1 is a front elevation of one embodiment;
FIG. 2 is a rear elevation thereof;
FIG. 3 is a section along lines 3—3 of FIG. 1;
FIG. 4 is a front elevation with the rotor removed;
FIG. 5 is an example of an alternative capacitor construction;
FIG. 6 is a front elevation of a rotor construction suitable for use in the embodiment in FIG. 5;
FIG. 7 is an end view of the rotor of FIG. 6;
FIG. 8 illustrates another rotor construction suitable for use in the embodiment in FIG. 5; and
FIG. 9 is a section along lines 9—9 of FIG. 8.

It will be appreciated that this invention has universal applicability to variable capacitors of all types; however, it is particularly well suited for use in miniaturized variable capacitors wherein the capacitor rotor also provides the dielectric medium for the capacitor unit and therefore it will be discussed in, but is not limited to, that environment.

With particular reference to the drawings, capacitor 10 includes a base 12 and a rotor 16. A stator plate 14 (see FIG. 4) is provided on base 12 by metallizing in any suitable manner well known in the art. The configuration of the stator plate can vary as desired but preferably is semicircular.

Rotor 16 is connected for rotation with a shaft 18 which extends through base 12. One end of shaft 18 is provided with a rolled edge 21 which engages Y-shaped spring terminal 20 through washer 22. The opposite end of the shaft includes an elongated portion 23 connected to the rotor to complete the assembly of the shaft and rotor in the capacitor. An electrical terminal 24 is formed integrally with and extends from spring terminal 20 for connection to a suitable electrical lead and one of the legs 25 of spring terminal 20 is positioned between ribs 30—30 on base 12 so as to hold the spring terminal stationary during movement of rotor 16.

A rotor plate 32 is provided on rotor 16 and has a configuration conforming to that of the stator plate. Similarly to stator plate 14, the rotor plate comprises a metallized paint pattern. Movement of rotor 16 by turning shaft 18 operates to move the rotor and stator plates into and out of alignment. To facilitate rotation of the shaft and rotor, elongated portion 23 is generally slotted so as to be capable of receiving a suitable adjusting tool.

Stator electrode 14 includes a metallized extension 34 which is electrically connected to electrical terminal 38 through pin 36. Solder 40, 40, between elongated portion 23 and plate 32, establishes both a mechanical connection between the shaft and rotor and completes an electrical circuit to the rotor plate. Accordingly, an electrical circuit is completed from terminal 24 through spring terminal 20, washer 22, shaft 18, and solder connection 40 to the rotor plate. Similarly, an electrical circuit is completed to the opposite capacitor plate from terminal 38, through pin 36, metallized extension 34 to the stator plate. Hence the rotor and stator plates become the opposed plates of the capacitor with the rotor disposed therebetween to provide the capacitor dielectric. It will be appreciated that for purposes of illustration the thickness of the metallized portions has been exaggerated.

In accordance with this invention, the rotor is reinforced so that its thickness can be reduced to thereby increase the maximum capacitance and decrease the minimum capacitance of the unit. It will be observed that in the embodiment illustrated in FIGS. 1–4 rotor 16 includes a peripheral ridge 46 and a central hub 44 which form a well 45 therebetween. This well is filled with a reinforcing material 48 which can be any one of a number of substances such as a glaze or plastic material, either thermosetting or thermoplastic. The reinforcing material is capable of adhering to the rotor and, as it sets or cures, does not strain the rotor. With such reinforcing, approximately 50% reductions in thickness of the rotor, between electrodes, have been achieved without appreciably reducing rotor strength. For example, in a capacitor unit 10, constructed in accordance with heretofore well accepted practices and wherein the combined rotor and base thickness and the rotor diameter are approximately .297 inch and .640 inch respectively, the minimum rotor thickness was limited to approximately .019 inch; however, in accordance with this invention it is possible to reduce that rotor thickness to approximately .009–.011 inch. Such a reduction in thickness decreases the minimum capacity and also increases the maximum capacity. More particularly, in the example capacitor given and with a rotor of suitable ceramic material the available capacitance range has been increased from approximately 10–1 (5 pf.–50 pf.) to approximately 22–1 (4 pf.–90 pf.).

In constructing capacitor 10, the rotor is formed of a suitable dielectric material, such as a ceramic. Conforming metallized patterns are provided on the rotor and base. It should be noted here that the mating faces of the rotor and base are optically ground for most efficient engagement. A reinforcing medium, such as a refractory glaze or suitable plastic, is applied to the surface of the rotor upon which the rotor plate is formed.

The glaze can be applied in either powder or solution form and, where it is used, the rotor is subsequently fired to vitrify the glaze. In those instances where a plastic material is used as the reinforcing medium, it is allowed to cure in a manner and for a time determined by the particular plastic used. The opposite side of the rotor, i.e., that opposite to the side on which the reinforcing material is provided, is ground to reduce the rotor to a desired minimum thickness. The rotor is then assembled unto the base and is ready for connection in a particular electrical circuit.

In filling well 45 of capacitor 10 care must be taken to control the fill so as not to cover the top of hub 44 or to flow the reinforcing material over ridge 46 as this would cause grinding difficulties as well as interfere with the provision of a good electrical connection between the solder and the rotor plate.

This invention is applicable to use in other types of variable capacitors, for example that illustrated in FIG. 5. Capacitor unit 50 includes a base 52 and a rotor 54. Base 52 is provided with a metallized capacitor plate 56 (a portion of plate 56 is shown in FIG. 5 by breaking away part of rotor 54) having a metallized portion 58 extending to terminal 60 to which a suitable lead line may be attached.

In addition to the rotor construction discussed above in relation to capacitor 10, the rotor can be of laminar construction as illustrated in FIGS. 6 and 7. More particularly, rotor 54 includes a reinforcing segment 64 and a dielectric segment 66 having a capacitor plate 68 therebetween. Rotor 54 can be constructed by forming the rotor segments, segment 64 with a notch 70 and segment 66 without a notch, from suitable dielectric material such as a ceramic. Segment 66 is metallized to provide rotor plate 68 thereon and segments 64 and 66 are positioned in abutting relationship with plate 68 sandwiched therebetween and with notch 70 centered on rotor plate 68. The segments are pressed together and fired and the outer face 72 of dielectric segment 66 is ground to reduce the thickness of the segment with segment 64 providing the reinforcing necessary to prevent breakage during assembly. Prior to assembly of the rotor in capacitor 50, a metallized paint pattern 74 is screened onto the outer surface of segment 64 with the paint being permitted to flow into notch 70 to electrically contact capacitor plate 68. Spring terminal 76 is used to assemble the rotor in the capacitor with a pin 78 extending through the base and rotor to complete the capacitor assembly and provide an axis of rotation for the rotor. Pin 78 is electrically connected to a metallized pattern 80, which extends to a terminal 81, and spring terminal 76 electrically engages pattern 74 to complete an electrical circuit to plate 68. Accordingly, plates 56 and 68 become the opposed plates of the capacitor with segment 66 disposed therebetween to provide the dielectric.

If desired, segments 64 and 66 can be placed together before the metallizing paint of plate 68 is fired to insure a bond between the segments.

An alternative rotor construction for use in capacitor 50 is illustrated in FIGS. 8 and 9. Rotor 84 includes dielectric segment 86 and a cover or reinforcing segment 88, if desired the dielectric segment can comprise a suitable ceramic and the reinforcing segment can be made of steatite. In this construction metallized pattern 90 is provided on segment 86 and patterns 92 and 94 are provided on both sides of the reinforcing segment. The segments are joined by a suitable adhesive, such as rubber cement 96, with notch 98 centered on plate 90 and pattern 94 engaging plate 90. The rotor is assembled in the capacitor as described above in relation to the rotor of FIGS. 6 and 7 and the adhesive cement allowed to cure.

In accordance with this invention presently available capacity ranges can be provided with a reduction in size of the capacitor unit, or greater capacity ranges can be provided in standard size units. Furthermore, increased capacity ranges can be provided without additional cost and while providing mechanically stronger units.

It is to be understood that the term glaze as used in the specification and claims designates, as is common in the ceramic art, a coating of fired, hard, crystalline refractory material.

A divisional application is being filed to cover the method disclosed but not claimed herein.

Although this invention has been illustrated and described in connection with particular embodiments thereof, it will be apparent to those skilled in the art that various changes and modifications may be made therein without departing from the spirit of the invention or from the scope of the appended claims.

What I claim is:

1. In a variable capacitor having a first stationary capacitor plate the combination of, a rotor including oppositely facing surfaces and arranged with one of said surfaces disposed adjacent said first plate, a second capacitor plate on the other of said surfaces and movable with said rotor so that said first and second plates are movable into and out of alignment, and a refractory glaze connected to said other of said rotor surfaces for structurally reinforcing said rotor, said rotor being characterized by a minimum thickness which is less than the minimum thickness which said rotor could have from a structural standpoint without said reinforcing means.

2. The variable capacitor of claim 1 wherein said reinforcing means is generally coextensive with said other rotor surface.

3. In a variable capacitor having a first stationary capacitor plate the combination of, a dielectric member including a second capacitor plate and arranged for movement relative to said first plate with at least a portion thereof disposed intermediate said first and second plate, and means including a refractory glaze for structurally reinforcing said dielectric member, said dielectric member being characterized by a minimum thickness between said first and second plates which is less than the minimum thickness which said dielectric member could have from a structural standpoint without said reinforcing means.

4. In a variable capacitor having a first stationary capacitor plate the combination of, a generally planar rotor having a pair of oppositely facing surfaces and mounted for movement relative to said first plate and arranged with one of said oppositely facing surfaces disposed adjacent said first plate, a second capacitor plate on the other of said oppositely facing surfaces and movable with said rotor into and out of alignment with said first plate, and a refractory glaze on the other of said surfaces for structurally reinforcing said rotor, said rotor characterized by a minimum thickness which is less than the minimum thickness which said rotor could have from a structural standpoint without said reinforcing means.

5. A variable capacitor comprising, in combination, a first stationary capacitor plate, a generally planar dielectric member having oppositely facing surfaces with one of said surfaces disposed adjacent said first plate, a second capacitor plate on the other of said surfaces so that said dielectric member is positioned intermediate said first and second plates, a second generally planar member of refractory material attached to said other surface with said first member extending in face-to-face relationship over said second member to structurally reinforce said planar dielectric member and forming therewith a capacitor rotor, said first dielectric member characterized by a minimum thickness which is less than the minimum thickness which said first dielectric member could have from a structural standpoint without the structural reinforcing of said second member and means mounting said rotor for movement relative to said first plate so that said plates are movable into and out of alignment.

6. The variable capacitor of claim 5 including electrically conductive means connected to said second plate and extending through said second planar member.

7. The variable capacitor of claim 5 wherein said second planar member includes an aperture having electrically conductive means disposed therein and electrically connected to said second plate.

References Cited by the Examiner

UNITED STATES PATENTS

| | | | |
|---|---|---|---|
| 2,219,921 | 10/1940 | Gerth | 317—249 |
| 2,535,367 | 12/1950 | Minnium | 317—249 |
| 2,903,780 | 9/1959 | Barnard et al. | 29—25.42 |
| 2,972,180 | 2/1961 | Gulton et al. | 29—25.42 |
| 3,175,133 | 3/1965 | Matsui | 317—249 |

UNITED STATES PATENTS 726,958   3/1955   Great Britain.

OTHER REFERENCES 1,027,316, German printed application.

ROBERT K. SCHAEFER, *Primary Examiner.*

JOHN P. WILDMAN, JOHN F. BURNS, *Examiners.*

W. F. ZAGURSKI, E. A. GOLDBERG,
            *Assistant Examiners.*